United States Patent [19]
Gevelinger

[11] Patent Number: 6,121,180
[45] Date of Patent: Sep. 19, 2000

[54] PRECOMBUSTION OF HALOGEN-CONTAINING COMPOUNDS IN CATALYST REGENERATION PROCESSES

[75] Inventor: Thomas John Gevelinger, Oak Brook, Ill.

[73] Assignee: UOP LLC, Des Plaines, Ill.

[21] Appl. No.: 09/005,324

[22] Filed: Jan. 9, 1998

[51] Int. Cl.[7] .............................. B01J 20/34; B01J 38/42; B01J 38/44
[52] U.S. Cl. .............................. 502/35; 502/34; 502/36; 502/37; 502/38; 502/40; 502/41; 502/42; 502/43
[58] Field of Search .............................. 502/34, 35, 36, 502/37, 38, 40, 41, 42, 43

[56] References Cited

U.S. PATENT DOCUMENTS

| | | | |
|---|---|---|---|
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 4,687,637 | 8/1987 | Greenwood | 422/62 |
| 5,283,041 | 2/1994 | Nguyen et al. | 423/240 S |
| 5,451,388 | 9/1995 | Chen et al. | 423/240 R |
| 5,498,756 | 3/1996 | Micklich et al. | 422/223 |
| 5,756,414 | 5/1998 | Huang et al. | 502/37 |
| 5,763,348 | 6/1998 | Fung et al. | 502/37 |
| 5,837,636 | 11/1998 | Sechrist et al. | 502/35 |

FOREIGN PATENT DOCUMENTS

WO 96/20787 7/1996 WIPO.

OTHER PUBLICATIONS

Berglund, Ronald L. "Industrial Exhaust Control." in: *Kirk–Othmer Encyclopedia of Chemical Technology* (4th Ed), (John Wiley and Sons., 1994) vol. 9, pp. 1022–1060. no month available.

Bond, Geoffrey C. and Sadeghi, Nasser, "Catalysed Destruction of Chlorinated Hydrocarbons," in: *J. Appl. Chem. Biotechnol.*, (1975), 25, pp. 241–248. no month available.

Wang, Yi.; Shaw, Henry; and Farrauto, Robert J. "Catalytic Oxidation of Trace Concentrations of Trichloroethylene over 1.5% Platinum on Gamma–Alumina," in: Catalytic Control of Air Pollution: Mobile and Stationary Sources, edited by R.G. Silver et al. and published in *American Chemical Society Symposium Series 495* (1992) pp. 125–140. no month available.

Yu, Tai–Chiang; Shaw, Henry; and Farrauto, Robert J. "Catalytic Oxidation of Trichloroethylene over PdO Catalyst on Gamma–Alumina," in: *American Chemical Society Symposium Series 495* (1992) pp. 141–152. no month available.

Spivey, James J. "Complete Catalytic Oxidation of Volatile Organics," in: *Ind. Eng. Chem. Res.*, (1987), 26, pp. 2165–2180. no month available.

Kittrell, J.R.; Quinlan, C.W.; and Eldridge, J.W. "Direct Catalytic Oxidation of Halogenated Hydrocarbons," in: *J. Air Waste Manage. Assoc.*, vol. 41, No. 8, (Aug. 1991), pp. 1129–1133.

Lin, Jong–Liang and Bent, Brian E. "Thermal Decomposition of Halogenated Hydrocarbons on a Cu(111) Surface," in: *American Chemical Society Symposium Series 495* (1992) pp. 153–163. no month available.

Chatterjee, Sougato and Greene, Howard L. "Oxidative Catalysis of Chlorinated Hydrocarbons by Metal–Loaded Acid Catalysts," in: *Journal of Catalysis*, (1991), 130, pp. 76–85. no month available.

*Primary Examiner*—Elizabeth D. Wood
*Attorney, Agent, or Firm*—John G. Tolomei; Michael A. Moore

[57] ABSTRACT

A method for regenerating a hydrocarbon conversion catalyst wherein at least a portion of a halogen-containing compound is precombusted in a precombustion zone, and the catalyst is regenerated in the presence of the halogen. By precombusting the halogen-containing compound in a precombustion zone rather than in the regeneration zone, this invention decreases the risk of permanent catalyst deactivation and of costly equipment damage in the regeneration zone. This method is adaptable to many processes for the catalyst conversion of hydrocarbons in which deactivated catalyst particles are regenerated in a moving bed.

17 Claims, 1 Drawing Sheet

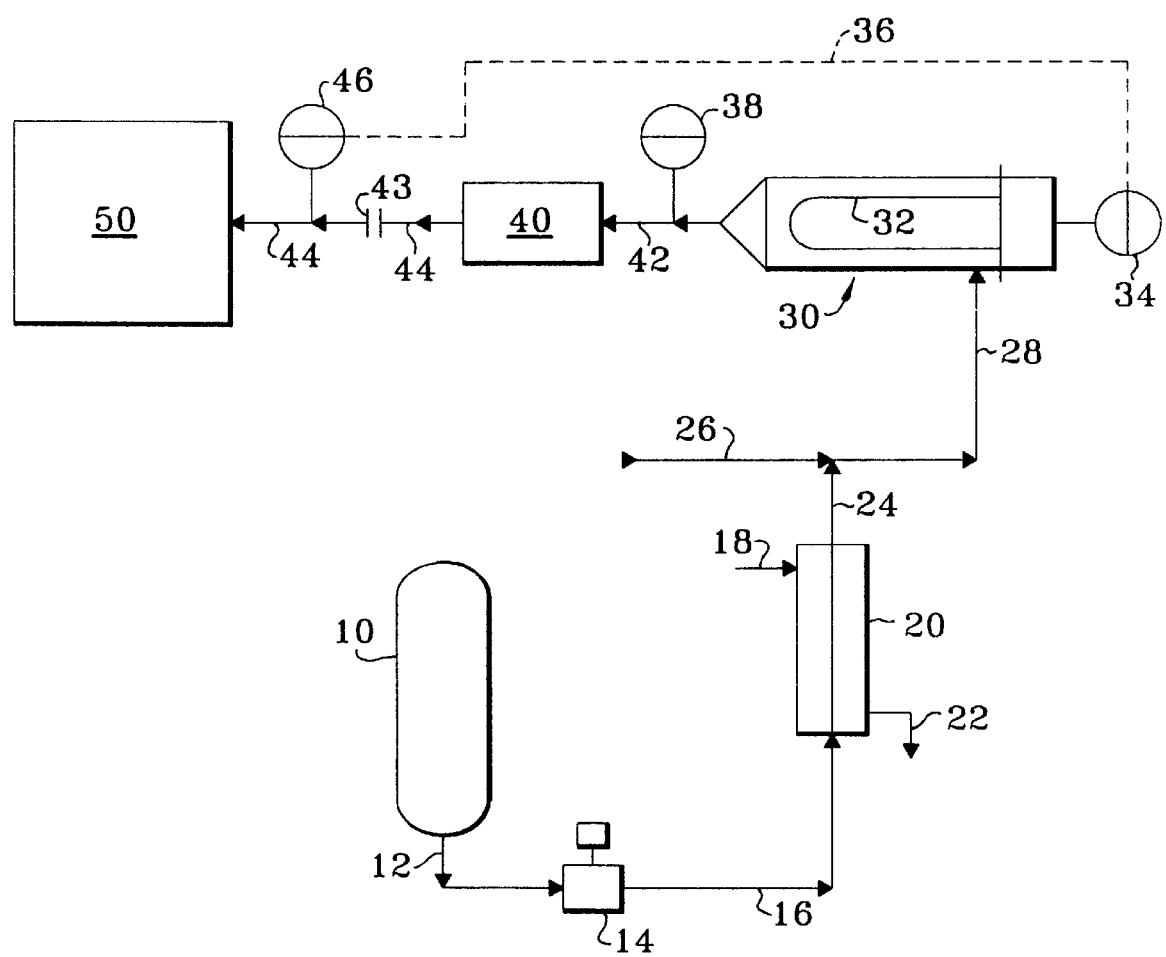

PRECOMBUSTION OF HALOGEN-CONTAINING COMPOUNDS IN CATALYST REGENERATION PROCESSES

FIELD OF THE INVENTION

This invention relates generally to hydrocarbon conversion catalyst regeneration that employs a halogen-containing compound.

BACKGROUND OF THE INVENTION

Although catalysts for the conversion of hydrocarbons have a tendency to deactivate, usually a catalyst's activity may be restored by one of a number of processes that are known generally as regeneration processes. Regeneration processes are extensively used. What specific steps comprise a regeneration process depend in part on the reason for the deactivation. For example, if the catalyst deactivated because coke deposits accumulated on the catalyst, regeneration usually includes removing the coke by burning. If the catalyst deactivated because a catalytic metal such as platinum became agglomerated, regeneration usually includes redispersing the metal by contacting the catalyst with oxygen and chlorine. If the catalyst deactivated because a catalytic promoter such as chloride became depleted, regeneration usually includes replenishing the promoter by contacting the catalyst with a chlorine-containing species. Operating conditions and methods for these regeneration processes are well known. Regeneration processes can be carried out in situ, or the catalyst may be withdrawn from the vessel in which the hydrocarbon conversion takes place and transported to a separate regeneration zone for reactivation. Arrangements for continuously or semicontinuously withdrawing catalyst particles from a reaction zone and for reactivation in a regeneration zone are well known.

Many of these regeneration processes share the common feature of introducing one or more chlorine-containing compounds into the regeneration zone in order to restore the activity of the catalyst for use in the reaction zone. Although chlorine is sometimes introduced into the regeneration zone, it is much more common that one of several chlorine-containing compounds, such as 1,1 dichloroethane, 1,2 dichloroethane, 1,1 dichloropropane, and 1,2 dichloropropane, is introduced into the regeneration zone. The most commonly used compounds thus contain not only chlorine but also carbon and/or hydrogen. Many regeneration zones into which these compounds are introduced typically contain molecular oxygen and operate at conditions that have been carefully optimized with a view towards combusting coke deposits on the catalyst or towards oxidizing or dispersing a catalytic metal on the catalyst. When a chlorine-containing compound is introduced into such a regeneration zone, it also is generally combusted or oxidized, and by-products of combustion, such as carbon dioxide, water, hydrogen chloride, and chlorine, are formed. As the chlorine-containing compound combusts, regions of intense burning can arise in the regeneration zone, either in portions of the catalyst and/or near to mechanical internals within the regeneration zone.

Two problems associated with localized regions of intense combustion of the chlorine-containing compound within the regeneration zone are catalyst deactivation and mechanical failure. As to catalyst deactivation, the combination of temperature, water vapor, and exposure time determine the useful life of the catalyst. Exposure of high surface area catalyst to high temperatures for prolonged periods of time will transform the catalyst into a more amorphous material that has a decreased surface area. Decreased surface area in turn can lower the activity of the catalyst to a level at which the catalyst is considered deactivated. This type of catalyst deactivation is permanent and can eventually render the catalyst unusable. Similarly, with respect to mechanical failure, the exposure of the internal mechanical parts of the regeneration zone to high temperatures for extended periods of time will change the physical properties of the parts and degrade or weaken their structural integrity. Consequently, the internal parts can break or crack, thereby necessitating costly repairs and downtime.

SUMMARY OF THE INVENTION

This invention is a method of introducing a halogen-containing compound that contains hydrogen or carbon into a catalyst regeneration zone. The method of this invention precombusts at least a portion of the hydrogen or carbon of the halogen-containing compound prior to using the halogen for catalyst regeneration. This invention is useful even though the catalyst regeneration zone operates at conditions that are sufficient to combust at least a portion of the hydrogen or carbon of the halogen-containing compound. By precombusting some or preferably all of the hydrogen or carbon of the halogen-containing compound in a precombustion zone, rather than in the regeneration zone, the possibility of localized regions of intense combustion of the halogen-containing compound in the regeneration zone is minimized or eliminated. Thus, this invention decreases the exposure of the catalyst to high temperatures, decreases the risk of permanent catalyst deactivation because of surface area decline, and prolongs the activity of the catalyst even after many regenerations. This invention also decreases the exposure of the internals of the regeneration zone to high temperatures, decreases the risk of weakening the internals of the regeneration tower, and prolongs the useful life of the mechanical equipment employed for regeneration.

Accordingly, in one embodiment, this invention is a method for regenerating a hydrocarbon conversion catalyst. At least a portion of the hydrogen or the carbon of a halogen-containing compound comprising hydrogen or carbon is precombusted in a precombustion zone. The hydrocarbon conversion catalyst is at least partially regenerated in the presence of the halogen in a regeneration zone at regeneration conditions comprising a regeneration temperature.

In a more specific embodiment, this invention is a hydrocarbon conversion process. A hydrocarbon feedstock is passed to a reaction zone where the feedstock is contacted with catalyst particles containing platinum. A hydrocarbon product is recovered from the reaction zone. Catalyst particles are withdrawn from the reaction zone and passed to a regeneration zone. Oxygen and perchloroethylene are passed to a precombustion zone, where at least 95% of the perchloroethylene that is passed to the precombustion zone is precombusted, thereby generating heat of the precombustion in the precombustion zone. A precombustion effluent stream comprising oxygen and molecular chlorine is withdrawn from the precombustion zone and passed to a cooling zone where the precombustion effluent stream is cooled. A cooled precombustion effluent stream comprising oxygen and molecular chlorine and having a precombustion effluent temperature of less than a regeneration temperature is withdrawn from the cooling zone. The precombustion effluent stream is passed to a regeneration zone that contains catalyst particles. In the regeneration zone, catalyst particles are contacted with the precombustion effluent stream and at least a portion of the platinum on the catalyst particles in the regeneration zone are redispersed at regeneration conditions. The regeneration conditions comprise a regeneration temperature of less than 1100° F. Catalyst particles are withdrawn from the regeneration zone, and catalyst particles are passed to the reaction zone.

INFORMATION DISCLOSURE

U.S. Pat. No. 3,652,231 (Greenwood et al.) describes a process and apparatus for continuous catalyst regeneration which are used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of U.S. Pat. Nos. 3,652,231, 3,647,680, and 3,692,496 are hereby incorporated in full into this patent application.

U.S. Pat. No. 4,687,637 (Greenwood) describes a process for continuous catalyst regeneration in which a halogenation agent, such as an organic chloride, is injected into an air stream, which is then heated and introduced into a halogenation section of a regeneration tower. The teachings of U.S. Pat. No. 4,687,637 are hereby incorporated in full into this patent application.

U.S. Pat. No. 5,498,756 (Micklich et al.) describes a process and apparatus for introducing a mixture of a chlorine compound and a drying gas into a two-pass baffle that is internal to the catalyst regeneration vessel. The teachings of U.S. Pat. No. 5,498,756 are hereby incorporated in full into this patent application.

Destruction of halogenated hydrocarbons is described on pages 1052–1053 of the article by R. L. Berglund, entitled "Industrial Exhaust Control," at pages 1022–1060 of Vol. 9 of *Kirk-Othmer Encyclopedia of Chemical Technology* (4th Ed), published in 1994 by John Wiley and Sons. This article also describes process and catalyst considerations that are pertinent to catalytic oxidation in general, such as the performance of catalytic metals, including vanadium, chromium, manganese, iron, cobalt, nickel, copper, ruthenium, rhodium, palladium, silver, osmium, iridium, platinum, and gold. In addition, this article describes the use of catalyst carriers and of catalyst supports such as spherical and cylindrical pellets, rods, ribbons, and honeycombs.

The use of platinum and palladium for the catalytic oxidation of halogenated hydrocarbons are known. Use of platinum on gamma-alumina for this purpose is described in the article by G. C. Bond et al., entitled "Catalysed Destruction of Chlorinated Hydrocarbons," *J. Appl. Chem. Biotechnol.,* 1975, 25, pages 241–248, and the article by Y. Wang et al., entitled "Catalytic Oxidation of Trace Concentrations of Trichloroethylene over 1.5% Platinum on Gamma-Alumina," beginning at page 125 in *Catalytic Control of Air Pollution: Mobile and Stationary Sources,* edited by R. G. Silver et al. and published in American Chemical Society Symposium Series 495 in 1992. The above-mentioned article by R. L. Berglund entitled "Industrial Exhaust Control," however, points out that catalyst deactivation by halogen degradation of the catalyst carrier or the washcoat may be a problem with platinum-containing catalysts. The use of palladium oxide on gamma-alumina is described in the article by Tai-Chiang Yu et al., entitled "Catalytic Oxidation of Trichloroethylene over PdO Catalyst on Gamma-Alumina," beginning at page 141 in the above-mentioned American Chemical Society Symposium Series 495. Use of oxides of platinum, palladium, or other platinum group metals on a high acidity support such as gamma-alumina, delta-alumina, theta-alumina, transitional forms of alumina, silica-alumina, and zeolites is described in U.S. Pat. No. 5,451,388 (Chen et al.). Use of a catalyst that comprises a platinum group metal, zirconium oxide, and at least one oxide selected from the group consisting of manganese oxide, cerium oxide, and cobalt oxide, and that is substantially free of vanadium is described in PCT International Publication No. WO 96/20787, which has an International Application No. PCT/US95/08060.

The use of metals other than platinum and palladium for the catalytic oxidation of halogenated hydrocarbons is also known. The article by James J. Spivey entitled "Complete Catalytic Oxidation of Volatile Organics," *Ind. Eng. Chem. Res.,* 1987, 26, 2165–2180 reviews the literature dealing with catalytic oxidation and cites uses of $Cr_2O_3$ on alumina to oxidize $CH_2Cl_2$, $C_2H_2Cl_2$, and $CH_3Cl$. Uses of vanadia alumina, of chromia alumina, and of another non-noble metal catalyst on a honeycomb support are described in the article by J. R. Kittrell et al., entitled "Direct Catalytic Oxidation of Halogenated Hydrocarbons," J. Air Waste Manage. Assoc., vol. 41, no. 8, August 1991, 1129–1133. Use of copper is described in the article by Jong-Liang Lin et al., entitled "Thermal Decomposition of Halogenated Hydrocarbons on a Cu(111) Surface," beginning at page 153 in the previously mentioned American Chemical Society Symposium Series 495. Use of zeolite catalysts H—Y, Cr—Y, and Ce—Y to oxidize methylene chloride in air is described in the article by S. Chatterjee et al., entitled "Oxidative Catalysis of Chlorinated Hydrocarbons by Metal-Loaded Acid Catalysts," *Journal of Catalysis,* 1991, 130, 76–85 (1991). Use of vanadium oxide, zirconium oxide, and least one oxide of manganese, cerium, or cobalt is described in U.S. Pat. No. 5,283,041 (Nguyen et al.). Use of oxides of vanadium, chromium, manganese, iron, nickel, cobalt, or copper on a high acidity support is described in previously mentioned U.S. Pat. No. 5,451,388 (Chen et al.).

BRIEF DESCRIPTION OF THE DRAWING

The drawing is a schematic flow diagram of an embodiment of the invention.

DETAILED DESCRIPTION OF THE INVENTION

This invention uses a precombustion zone in a catalyst regeneration process to precombust a wide variety of halogen-containing compounds. Although the halogen may be fluorine, bromine, or iodine, the preferred halogen is chlorine. The chlorine-containing compounds also contain carbon, hydrogen, or both. Suitable chlorine-containing compounds have the general formula, $C_mH_nCl_p$, where m is greater than or equal to zero, n is greater than or equal to zero, and p is greater than or equal to one. Preferably, m and n are minimized in order to minimize the generation of heat during precombustion of the chlorine-containing compound. In addition, n is preferably greater than or equal to p in order to favor formation of hydrogen chloride over chloro-carbon compounds in the precombustion zone, but if n is less than p supplemental hydrogen in the form of, for example, molecular hydrogen or methane can be introduced to the precombustion zone. Suitable chlorine-containing compounds include, but are not limited to: hydrogen chloride; monochloromethane (methyl chloride); dichloromethane (methylene chloride); trichloromethane (chloroform); tetrachloromethane (carbon tetrachloride); monochloroethane; 1,1-dichloroethane; 1,2-dichloroethane (ethylene dichloride); 1,1,1-trichloroethane (methyl chloroform); 1,1,2-trichloroethane; chloroethene (vinyl chloride monomer); 1,1,2-trichloroethene (trichloroethylene); 1,1,2,2- tetrachloroethene (perchloroethylene); hexachloroethane; 1,1-dichloropropane; 1,2-dichloropropane (propylene dichloride); 1,3 dichloropropane; and 2,2 dichloropropane. The chemical composition of the chlorine-containing compound is, of course, only one factor in the selection of a particular chlorine-containing compound for any particular regeneration zone. Other relevant factors are cost, availability, ease of handling, volatility, and other physical properties.

The precombustion of the chlorine-containing compound generally takes place according to Eqs. 1 and 2:

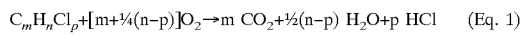
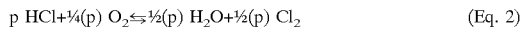

$$C_mH_nCl_p + [m + \tfrac{1}{4}(n-p)]O_2 \rightarrow m\ CO_2 + \tfrac{1}{2}(n-p)\ H_2O + p\ HCl \quad \text{(Eq. 1)}$$

$$p\ HCl + \tfrac{1}{4}(p)\ O_2 \leftrightharpoons \tfrac{1}{2}(p)\ H_2O + \tfrac{1}{2}(p)\ Cl_2 \quad \text{(Eq. 2)}$$

Eq. 2, which is commonly known as the Deacon equilibrium reaction, in effect represents the combustion of hydrogen chloride, and therefore in this context can be viewed as a further step beyond that of Eq. 1 toward a more-complete precombustion of the chlorine-containing compound. As a minimum, oxygen must be provided in order to precombust at least a portion of the carbon in the chlorine-containing compound to carbon monoxide, and preferably to carbon dioxide by Eq. 1, or in order to precombust at least a portion of the hydrogen in the chlorine-containing compound to water by Eq. 1 or Eq. 2. Because oxygen in excess of this minimum amount generally has no deleterious effect on the precombustion of the chlorine-containing compound, preferably sufficient oxygen is provided so that the extent of reaction of Eq. 1, as measured by the extent of combustion of carbon or hydrogen, is greater than 95%.

The chlorine-containing by-product of the precombustion of the chlorine-containing compound is hydrogen chloride by Eq. 1 and molecular chlorine by Eq. 2. Although other chlorine-containing by-products, such as compounds comprising carbon and chlorine both with and without oxygen are possible, such by-products are not preferred because they are the result of incomplete carbon combustion. As between hydrogen chloride and chlorine, if molecular chlorine rather than hydrogen chloride is desired in the effluent of the precombustion zone, then in theory even more oxygen can be introduced to the precombustion zone in order to force the Deacon equilibrium of Eq. 2 toward the formation of molecular chlorine, so that the extent of reaction of Eq. 2, as measured by the extent of conversion of hydrogen chloride, is greater than 50% and preferably greater than 75%. It is believed, however, that in practice this is usually not an important consideration, even if chlorine rather than hydrogen chloride is desired in the regeneration zone. This is because in the regeneration zone the oxygen concentration, water concentration, and the other operating conditions are usually carefully controlled at steady state conditions, and these steady state conditions along with the Deacon reaction dictate the steady state concentrations of chlorine and hydrogen in the regeneration zone. In addition, the volumetric flow rate of the effluent stream of the precombustion zone is generally small relative to the volumetric capacity of the regeneration zone. Thus, variations in the concentrations of hydrogen chloride and chlorine in the precombustion effluent stream do not have a significant effect on the concentrations in the regeneration zone. In fact, the very steps that are taken to convert hydrogen chloride to chlorine in the precombustion zone may be undone in the regeneration zone, where, depending on the operating conditions of the regeneration zone, some or all of the chlorine formed in the precombustion zone may be converted back to hydrogen chloride.

In general, it is believed that benefits associated with this invention arise as long as some of the carbon or hydrogen of the chlorine-containing compound precombusts in the precombustion zone. The extents to which Eq. 1 and Eq. 2 proceed depend upon the extent to which the combustion of any residual carbon, hydrogen, or hydrogen chloride in the effluent stream of the precombustion zone has a deleterious effect on the catalyst or equipment in the regeneration zone. This in turn depends in part on the extent to which the regeneration zone minimizes localized regions of intense combustion that arise in the regeneration zone as a result of combustion of residual carbon, hydrogen, or hydrogen chloride. Prolonged high-temperature exposure of the catalyst or equipment associated with the regeneration zone can cause permanent damage to that catalyst or equipment.

Several factors determine the desired degree of precombustion of the chlorine-containing compound in the precombustion zone. One factor is the heat of combustion of the chlorine-containing compound. In general, the greater the heat of combustion, the greater is the desired degree of precombustion in the precombustion zone. Another factor is the rate of combustion of the chlorine-containing compound when, once within the regeneration zone, it comes in contact with the catalyst, the regeneration gases, or equipment or internals. In combination with the heat of combustion, the rate of combustion determines the rate of heat generation by combustion of the chlorine-containing compound in the regeneration zone. A third factor is the gas hourly space velocity of the regeneration gases in the regeneration zone. In general, the higher the gas hourly space velocity, the greater is the heat sink that is capable of conveying the heat of combustion away from the location in the regeneration zone where the heat of combustion of the chlorine-containing compound is generated. For example, however, this invention is particularly applicable if the gas hourly space velocity of the regeneration zone is generally less than 4000 hr$^{-1}$. A fourth factor is the heat capacity of the catalyst and equipment in the regeneration zone. The greater the heat capacity, the lower is the temperature rise that occurs in the catalyst as a result of the generation of the heat of combustion. A fifth factor is the physical properties other than heat capacity of the catalyst or equipment, such as brittleness and crushing strength. In general, the sturdier the catalyst or equipment, the less likely it is that the heat generated by combustion will damage the catalyst or equipment. A sixth factor is the capability of the catalyst or equipment within the regeneration zone to exchange or otherwise dissipate the heat of combustion from the site of the combustion of the chlorine-containing compound. The greater the heat dissipation, the lower will be the rise in temperature of the catalyst or equipment.

Although this invention does not require any particular source of oxygen for the precombustion zone, the oxygen is generally provided by an ambient air stream. Accordingly, components of ambient air other than oxygen, such as nitrogen, carbon dioxide, argon, and water vapor, may also be present during precombustion, provided that these other components do not prevent the extent of reaction of Eq. 1 from attaining at least 50%. The ambient air may have been dried, however, to remove water to a concentration of less than 5 v-ppm, but removal of water from the air is not a necessary element of this invention. In addition, the air may have been purified to remove trace contaminants such as sulfur that are poisons or otherwise have a deleterious effect on catalyst, if any, that is employed in the precombustion zone or on the catalyst in the regeneration zone. Also, for reasons that are generally associated with the regeneration zone rather than the precombustion zone, the concentration of oxygen in the stream that is provided for precombustion may be the same, more, or less than the concentration of oxygen in ambient air. Decreasing the oxygen concentration in the stream that is passed to the regeneration zone from the usual 21 mol-% found in ambient air to, for example, about 7 mol-% offers certain advantages in some regeneration zones whereas enriching the oxygen concentration in the stream to, for example, about 39 mol-% offers other advantages. Thus, depending on the desired effect in the regeneration zone, an operator of a regeneration zone can vary the oxygen concentration in the stream to the precombustion step in order to attain a desired oxygen concentration in the effluent stream of the precombustion step and, hence, the stream to the regeneration zone. A number of processes are known, commercially available, and economical for enriching air streams with oxygen or nitrogen. Such processes include those that use selective adsorbents, gas permeable membranes, or a combination of both. One such process that uses a gas permeable membrane is shown in U.S. Pat. No. 4,787,919, and additional diffusion membranes for separation of gases are shown in U.S. Pat. No. 3,830,733. The teachings of these two patents are incorporated herein by reference.

Cooling of the chlorine-containing by-product of the precombustion is not a necessary element of this invention, and indeed such cooling may be an unnecessary expense in some applications of this invention. For example, where a precombustion zone effluent stream containing the chlorine-containing by-product carries the heat of precombustion from the precombustion zone, thorough mixing of the effluent stream may suffice to adequately dissipate the heat of precombustion throughout the effluent stream so that no localized regions of high temperature arise. In other applications, however, even perfect mixing of the precombustion zone effluent stream may be insufficient to prevent localized high temperatures. In those applications where mixing does not suffice, the chlorine-containing by-product of the precombustion may be cooled by transferring heat, including a portion of the heat of precombustion, from the precombustion zone or from the precombustion zone effluent stream to a heat sink other than the regeneration zone. The extent of cooling or the size of the portion of the heat of precombustion that is transferred in any particular embodiment of this invention depends on a number of factors, including the heat of combustion of the chlorine-containing compound, and the desired operating temperatures of the precombustion zone and the regeneration zone. For example, if the chlorine-containing compound has a relatively high heat of combustion and the desired operating temperatures of the precombustion zone and the regeneration zone are relatively low, then it may be desirable for 95% or more of the heat of combustion to be transferred from the precombustion zone. Suitable means for transferring not only relatively large portions but also relatively small portions of the heat of combustion are known to persons of ordinary skill in the art of heat transfer and include radiant heat transfer from the precombustion zone, indirect heat transfer from the precombustion zone to a coolant such as cooling water, and heat transfer from a precombustion effluent stream that carries the heat of precombustion from the precombustion zone.

Generally, for the regeneration zones to which this invention is applicable, if the chlorine-containing compound were combusted in the regeneration zone, or if the entire heat of the combustion of the halogen-containing compound were otherwise transferred to the regeneration zone, then the regeneration zone could operate, at least in a localized area, at a temperature that is in excess of some maximum temperature that is associated with the regeneration zone. In general, this maximum temperature is the temperature at which a hazard or risk to the catalyst or the equipment in the regeneration zone increases to an extent that is unacceptable. With respect to the catalyst, such hazard or risk could include, for example, some type of permanent, irreversible deactivation or deterioration of the catalyst, such as a decline in the surface are of the catalyst, a change of solid phase of the catalyst, or severe agglomeration of the catalyst metal. For typical catalysts used in reforming processes, the maximum temperature is approximately 1300 to 1550° F. (704 to 843° C.). With respect to equipment, the maximum temperature could be the design temperature of the equipment, and the hazard or risk could include some type of equipment failure, such as a change in the physical properties or some other degradation or weakening of structural integrity of a component of the equipment. Equipment that may be susceptible to such hazard or risk includes the shell or the internals of vessels, heaters, and heat exchangers that are used in catalyst regeneration. The piping between such equipment also may be susceptible. For a particular component of an item of equipment in a regeneration zone, its maximum temperature depends on its particular service, including whether the component is subject to stress as a result of being a pressure-containing component. For example, for an incoloy or inconel component of a typical reforming catalyst regeneration vessel that operates at from about 15 to about 50 psi (103 to 344 kPa) absolute, the maximum temperature is approximately 1000 to 1050° F. (538 to 566° C.) for a pressure-containing component such as the shell of the vessel but possibly as high as 1400° F. (760° C.) for a component such as an internal screen or baffle within the vessel that does not contain pressure.

This invention is applicable to a number of common regeneration zones for reforming catalysts, such as regeneration zones for the combustion of coke deposits on the catalyst, for the redispersion of the metal on the catalysts, for rehalogenating the catalyst, and for drying the catalyst. However, this invention is not limited to any particular regeneration zone. The regeneration zones to which this invention is applicable often operate at conditions at which at least a portion of the carbon or hydrogen of the chlorine-containing compound would combust, if the chlorine-containing compound was introduced directly into the regeneration zone. For example, a regeneration zone that redisperses a metal such as platinum on a reforming catalyst typically operates at conditions that include a temperature of from about 700 to about 1100° F. (371 to 593° C.), a pressure of from about 0 to about 500 psi (0 to 3447 kPa) absolute, and an oxygen concentration of from about 5 to about 21 mol-% oxygen. Molecular chlorine is usually present to disperse the platinum on the catalyst in the regeneration zone. These conditions are generally sufficient to combust at least a portion of the hydrogen or carbon in the previously listed halogen-containing compounds. In another example, a regeneration zone that dries water from a reforming catalyst typically operates at conditions that include a temperature of from about 700 to about 1100° F. (371 to 593° C.), a pressure of from about 0 to about 500 psi (0 to 3447 kPa) absolute, and an oxygen concentration of from about nil to about 21 mol-% oxygen. Provided that some oxygen is present in the drying zone, these conditions are also generally sufficient to combust at least a portion of the hydrogen or carbon in the previously listed halogen-containing compounds.

The precombustion takes place in a precombustion zone that is external to or separate from the regeneration zone.

The precombustion conditions can be any conditions that are suitable to precombust at least a portion of the carbon or hydrogen of the chlorine-containing compound, and a person of ordinary skill in the art can determine suitable precombustion conditions without undue experimentation. Preferably, the precombustion temperature is less than the regeneration conditions. In general, however, the precombustion conditions depend on the particular method of precombustion. One of the best known methods for combusting halogen-containing compounds is thermal oxidation. In thermal oxidation, the combustion reaction is activated by heat and also operates with homogenous gas-phase reaction conditions. The heat of activation can be provided to the halogen-containing compound by any suitable source of energy, such as indirect heat exchange, radiant heat transfer, or in situ combustion of a fuel with the halogen-containing compound. Although widely used, thermal oxidation devices are prone to several operational problems, such as high temperatures, cracking and leaking, production of undesirable by-products, and other problems associated with a less than optimal arrangement to accommodate intermixing of reactants, reaction kinetics in stoichiometry, and the generation of the heat of combustion. Thermal oxidation is discussed in the article by R. L. Berglund, "Industrial Exhaust Control," in: *Encyclopedia of Chemical Technology* (4th Ed., 1994), Vol. 9, pp.1022–1060. A second method that can be employed for the precombustion step is catalytically stabilized thermal combustion, which is described in the article by Hung, S. L., et al. "Methyl Chloride and Methylene Chloride Incineration in a Catalytically Stabilized Thermal Combuster" *Environ. Sci Technol.*, Vol. 23, No. 9, pp.1085–1091.

A third and preferred method of precombustion is catalytic oxidation, which is also described in the above-mentioned article by R. L. Berglund. As described previously, various catalysts are known and can be employed for the catalytic oxidation of halogen-containing compounds. If the catalyst in the precombustion zone becomes deactivated because of the precombustion reactions, it can be replaced with fresh precombustion catalyst or it can be regenerated batchwise, semicontinuously, or continuously.

The preferred catalytic oxidation catalyst is the catalyst that is being regenerated in the regeneration zone, which of course is the catalyst that is employed in the hydrocarbon conversion process that is associated with the catalyst regeneration zone. Although the original intended use of this catalyst may have been the conversion of hydrocarbons, many hydrocarbon conversion catalysts comprise an inorganic support such as alumina and one of the previously described transition metals that are known to catalyze oxidation of halogen-containing compounds at suitable oxidation conditions. Thus, numerous hydrocarbon conversion catalysts may be used in the precombustion zone of this invention. They include catalysts for reforming, dehydrogenation, isomerization, alkylation, transalkylation, and other catalytic conversion processes. These catalysts are well known. See, for example, U.S. Pat. Nos. 2,479,110 and 5,128,300 (reforming); 4,430,517 and 4,886,928 (dehydrogenation); 2,999,074 and 5,017,541 (isomerization); 5,310,713 and 5,391,527 (alkylation); and 3,410,921 (transalkylation). The teachings of these patents are incorporated herein by reference.

One of the advantages of using the same catalyst for both precombustion and hydrocarbon conversion is that a single regeneration zone may be used to regenerate not only catalyst that has become deactivated as a result of catalyzing hydrocarbon conversion reactions but also catalyst that has become deactivated as a result of catalyzing precombustion reactions. It is believed that the mechanisms that deactivate catalysts used in precombustion include coke deposition and metal agglomeration and are similar to deactivation mechanisms for catalysts that are employed in hydrocarbon conversion. Accordingly, a zone for regenerating a hydrocarbon conversion catalyst may be capable of at least partially regenerating a catalyst that has become deactivated by precombustion. It is believed that a preferred method of operating such a single zone is to at least intermittently mix a catalyst stream that has become deactivated by hydrocarbon conversion with a catalyst stream that has become deactivated by precombustion, and then to regenerate the mixture. It is believed that a single regeneration zone that regenerates the mixture will be less complex and less costly to operate than a single regeneration zone that regenerates the two catalyst streams separately.

It is believed that the most widely-practiced catalytic hydrocarbon conversion process to which the present invention is applicable is catalytic reforming. Therefore the discussion of the invention herein will refer to its application to a catalytic reforming reaction system. It is not intended that this limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (82° C.) and an end boiling point of about 400° F. (204° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and deydroisomerization of alkyicyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as gamma, eta, and theta alumina, with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about 1/16th to about 1/8th inch (1.6–3.1 mm), though they may be as large as 1/4th inch (6.35 mm). In a particular regenerator, however, it is desirable to use catalyst particles which fall in a relatively narrow size range. A preferred catalyst particle diameter is 1/16th inch (1.6 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

The present invention is applicable to a reforming process with fixed- or moving-bed reaction zones and fixed- or moving-bed regeneration zones. This invention is preferably applied to a reforming process with a moving bed reaction zone and a moving bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multistep regeneration process is used to regenerate the catalyst to restore its full reaction promoting ability. Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it is semicontinuous. By semicontinuous movement it is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The drawing shows a preferred embodiment of the invention where the precombustion step occurs in a precombustion zone 40 that is separate from the regeneration zone 50. A storage vessel 10 provides a reservoir of liquid chlorine-containing compound that is supplied through a line 12 to an injection pump 14. The discharge of injection pump 14 flows through a line 16 to a small vaporizing steam jacket 20 that ensures that the chlorine-containing compound is fully vaporized. Steam is provided to steam jacket 20 through a line 18, and vent steam and/or condensate is withdrawn from steam jacket 20 through a line 22. The chlorine-containing compound vapor in line 24 mixes with an oxygen-containing gas that flows through a line 26. The oxygen-containing gas in the line 26 may be merely the amount of gas necessary to precombust the chlorine-containing compound flowing in the line 24. The oxygen-containing gas may be air. The mixture of oxygen-containing gas in chlorine-containing compound flows through a line 28 to an electric heater 30. Preferably, the chlorine-containing compound in line 28 remains in a vapor form to prevent the entry of acid droplets into the heater 30. Power controller 34 controls the amount of electrical energy to the elements 32 of electric heater 30. The gas-vapor mixture in line 28 contacts the heater elements 32, is heated, and exits the heater 30 through a line 42. A temperature indicator 38 measures the inlet temperature of the precombustion zone 40. Preferably, the stream in line 42 is well mixed to prevent channeling or slugging of chlorine-containing compounds into the precombustion zone 40. A small in-line mixer may be added in line 42 to ensure that the stream flowing in line 42 is well mixed. The addition of the in-line mixer generally imposes only minor expense on the system due to the relatively small gas flow through line 42.

Precombustion zone 40 precombusts at least a portion of the carbon or hydrogen in the chlorine-containing compound entering through the line 42. To promote precombustion, precombustion zone 40 uses platinum-containing catalyst particles (not shown). The contents or the effluent of the precombustion zone 40 can be cooled in order to transfer at least a portion of the heat of precombustion to the environment by means for radiant or convective heat transfer. Suitable means for radiant heat transfer include but are not limited to an uninsulated flange 43 in line 44, which is the means for heat transfer that is shown in the drawing, or an uninsulated or partially insulated length of line 44. Suitable means for convective heat transfer include but are not limited to cooling coils in precombustion zone 40 through which cool water or cool air can pass. By precombusting at least a portion of the carbon or hydrogen in the precombustion zone 40 and by transferring at least a portion of the heat of precombustion away from the regeneration zone 50, away from the lines 28, 42, and 44, and away from the electric heater 30 and the heater elements 32, this equipment, as well as the catalyst in the regeneration zone 50 is protected from unacceptable, high-temperature damage.

After contact with the catalyst particles in the precombustion zone 40, the gas stream passes through a line 44, which contains the flange 43, and into the regeneration zone 50. A temperature indicator-controller 46 measures the inlet temperature of the regeneration zone 50. In addition and in conjunction with temperature indicator 38, temperature indicator-controller 46 measures the temperature rise across the precombustion zone 40. Also, temperature indicator-controller 46 generates a signal 36 that is representative of the difference between the actual and desired inlet temperatures of the regeneration zone 50. Signal 36 in turn provides a set point to the power controller 34.

Several variations on the flow scheme shown in the drawing are possible and are within the scope of this invention as set forth in the claims. One possible variation follows from the observation that in the flow scheme in the drawing the only gas that enters the regeneration zone 50 is the effluent of the precombustion zone 40, which is the product of precombusting the chlorine-containing compound in line 24 with the oxygen-containing gas in line 26. A possible variation, therefore, is that the regeneration zone 50 may require additional gas that is in excess of the gas that exits the precombustion zone 40. Any such additional gas can be introduced into line 44, preferably upstream of temperature indicator 46. In a second possible variation, the oxygen-containing gas, which enters through the line 26 in the flow scheme in the drawing, may also be introduced, in whole or in part, upstream of the steam jacket 20. A third possible variation, which is related to the second variation, is to introduce the oxygen-containing gas, in whole or in part, downstream of the electric heater 30. A fourth possible variation on the flow scheme in the drawing is to eliminate, in whole or in part, the electric heater 30, and to instead provide the oxygen-containing gas through line 26 at a temperature that, after mixing with the chlorine-containing compound flowing in the line 24, is sufficient for the gas-vapor mixture in line 28 to be passed directly to the precombustion zone 40. A common source of oxygen-containing gas at such a sufficient temperature may be a section of the regeneration zone 50 itself. For example, if the regeneration zone 50 has a catalyst drying section (not shown) and a hot dry gas effluent from the catalyst drying section is routed to the regeneration zone 50 through lines 26 and 28, heater 30, line 42, precombustion zone 40, and line 44, then the hot gas effluent from the catalyst drying section may be at such a sufficient temperature that the heater 30 can be eliminated. A fifth possible variation, which also could eliminate the electric heater 30, is to introduce and ignite a controlled amount of a combustible fuel, such as methane or refinery fuel gas, in line 42 or in the precombustion zone 40. When the fuel is ignited, its heat of combustion may be sufficient to heat the chlorine-containing compound within the precombustion zone 40 to a temperature that is greater than its autoignition temperature. If the chlorine-containing compound can be ignited in this manner, then the electric heater 30 might not be needed.

What is claimed is:

1. A method for regenerating a hydrocarbon conversion catalyst, said method comprising the steps of:
   a) precombusting at least a portion of the hydrogen or the carbon of a halogen-containing compound comprising hydrogen or carbon in a precombustion zone;
   b) passing a halogen from said precombustion zone to a regeneration zone;
   c) at least partially regenerating said hydrocarbon conversion catalyst in the presence of said halogen and oxygen in said regeneration zone at regeneration conditions comprising a regeneration temperature.

2. The method of claim 1 further characterized in that said precombustion occurs at a precombustion temperature that is greater than said regeneration temperature.

3. The method of claim 1 further characterized in that said precombustion generates heat of said precombustion and produces a precombustion effluent stream comprising said halogen, said precombustion effluent stream is withdrawn from said precombustion zone and passed to a cooling zone, said precombustion effluent stream is cooled in said cooling zone to produce a cooled precombustion effluent stream, and said cooled pre-combustion effluent stream is passed to said regeneration zone.

4. The method of claim 3 further characterized in that said cooling occurs at a cooling temperature that is greater than said regeneration temperature.

5. The method of claim 1 further characterized in that said precombustion is promoted by a precombustion catalyst.

6. The method of claim 5 further characterized in that said precombustion at least partially deactivates said precombustion catalyst and said regeneration conditions are sufficient to at least partially regenerate said precombustion catalyst.

7. The method of claim 5 further characterized in that said precombustion catalyst comprises said hydrocarbon conversion catalyst.

8. The method of claim 1 wherein said halogen-containing compound is selected from the group consisting of hydrogen chloride; monochloromethane; dichloromethane; trichloromethane; carbon tetrachloride; monochloroethane; 1,1 dichloroethane; 1,2 dichloroethane; 1,1,1 trichloroethane; 1,1,2 trichloroethane; 1,1,2 trichlorethylene; tetrachloroethylene; hexachloroethane; 1,1 dichloropropane; 1,2 dichloropropane; 1,3 dichloropropane; and 2,2 dichloropropane.

9. The method of claim 1 wherein the precombusted hydrogen or the precombusted carbon comprises at least 95% of the hydrogen or the carbon of said halogen-containing compound.

10. The method of claim 1 further characterized in that said hydrocarbon conversion catalyst contains carbon, and said regeneration conditions are sufficient to remove at least a portion of the carbon from said hydrocarbon conversion catalyst by combustion.

11. The method of claim 1 further characterized in that said hydrocarbon conversion catalyst comprises a metal, and said regeneration conditions are sufficient to disperse at least a portion of said metal.

12. The method of claim 1 further characterized in that said hydrocarbon conversion catalyst comprises water, and said regeneration conditions are sufficient to remove at least a portion of the water from said hydrocarbon conversion catalyst.

13. The method of claim 1 further characterized in that said regeneration conditions are sufficient for combusting hydrogen or carbon of said halogen-containing compound.

14. The method of claim 1 further characterized in that said regeneration comprises contacting said hydrocarbon conversion catalyst with a regeneration gas at a gas hourly space velocity of less than 4000 $hr^{-1}$.

15. The method of claim 1 wherein said regeneration temperature is less than about 1400° F.

16. The method of claim 1 wherein said hydrocarbon conversion catalyst is regenerated in the presence of hydrogen chloride or molecular chlorine.

17. A method for regenerating a hydrocarbon conversion catalyst said method comprising the steps of:
   a) passing a halogen-containing compound comprising hydrogen or carbon to a precombustion zone;
   b) precombusting at least a portion of the hydrogen or the carbon of said halogen-containing compound in a precombustion zone to produce an effluent stream comprising a halogen of said halogen-containing compound;
   c) contacting said hydrocarbon conversion catalyst in a regeneration zone with at least a portion of said effluent stream; and
   d) at least partially regenerating said hydrocarbon conversion catalyst in the presence of said halogen and oxygen in said regeneration zone at regeneration conditions comprising a regeneration temperature of less than 1100° F.

* * * * *